(12) United States Patent
Kawabata et al.

(10) Patent No.: US 10,394,180 B2
(45) Date of Patent: *Aug. 27, 2019

(54) CLEANING BLADE

(71) Applicants: NOK CORPORATION, Tokyo (JP); SYNZTEC CO., LTD., Tokyo (JP)

(72) Inventors: Syo Kawabata, Kanagawa (JP); Kenji Sasaki, Kanagawa (JP); Yasushi Sugiyama, Kanagawa (JP); Hiroaki Kaneda, Kanagawa (JP); Natsumi Kimura, Kanagawa (JP); Katsuya Shimotsuma, Ibaraki (JP); Koji Nishiguchi, Ibaraki (JP); Shuji Abe, Kanagawa (JP); Hidetomo Mukai, Kanagawa (JP)

(73) Assignees: NOK CORPORATION, Tokyo (JP); SYNZTEC CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/065,954

(22) PCT Filed: Dec. 22, 2016

(86) PCT No.: PCT/JP2016/088454
§ 371 (c)(1),
(2) Date: Jun. 25, 2018

(87) PCT Pub. No.: WO2017/111061
PCT Pub. Date: Jun. 29, 2017

(65) Prior Publication Data
US 2019/0011872 A1    Jan. 10, 2019

(30) Foreign Application Priority Data
Dec. 25, 2015   (JP) ................. 2015-255289

(51) Int. Cl.
*G03G 21/00* (2006.01)
*G03G 15/00* (2006.01)
(Continued)

(52) U.S. Cl.
CPC ......... *G03G 21/0017* (2013.01); *B32B 27/40* (2013.01); *C08G 18/3206* (2013.01);
(Continued)

(58) Field of Classification Search
CPC ....... G03G 21/0017; G03G 2221/0005; C08G 18/7664; C08G 18/4277; C08G 18/3206;
(Continued)

(56) References Cited

U.S. PATENT DOCUMENTS 7,778,585 B2   8/2010   Uchida et al.
8,224,224 B2   7/2012   Ohmori et al.
(Continued)

FOREIGN PATENT DOCUMENTS

CN   1755551 A    4/2006
CN   101617277 A  12/2009
(Continued)

OTHER PUBLICATIONS

International Search Report, dated Feb. 28, 2017, from corresponding PCT application No. PCT/JP2016/088454.
(Continued)

*Primary Examiner* — Susan S Lee
(74) *Attorney, Agent, or Firm* — Young & Thompson

(57) ABSTRACT

A cleaning blade 1 includes an elastic body 11 that is a molded body of a rubber base material, and which has at least a surface treatment layer 12 in a portion of the elastic body 11, the portion coming into contact with an object to be contacted. The surface treatment layer 12 is formed by impregnating a surface portion of the elastic body 11 with a surface treatment liquid, which contains an isocyanate com- (Continued)

pound and an organic solvent, and curing the surface treatment liquid; the surface treatment layer 12 has an elastic modulus of 95 MPa or less; the elastic body 11 has an elastic modulus of from 20 MPa to 60 MPa (inclusive); and the difference between the elastic modulus of the surface treatment layer 12 and the elastic modulus of the elastic body 11 is 1 MPa or more.

2 Claims, 1 Drawing Sheet

(51) Int. Cl.
| | | |
|---|---|---|
| *B32B 27/40* | (2006.01) | |
| *C08J 7/04* | (2006.01) | |
| *C08G 18/32* | (2006.01) | |
| *C08G 18/42* | (2006.01) | |
| *C08G 18/76* | (2006.01) | |
| *C08J 3/24* | (2006.01) | |
| *C09D 175/04* | (2006.01) | |

(52) U.S. Cl.
CPC ..... *C08G 18/4277* (2013.01); *C08G 18/7664* (2013.01); *C08J 3/24* (2013.01); *C08J 7/04* (2013.01); *C08J 7/047* (2013.01); *C09D 175/04* (2013.01); *G03G 15/00* (2013.01); *G03G 21/00* (2013.01); *C08J 2375/06* (2013.01); *C08J 2475/04* (2013.01); *G03G 2221/0005* (2013.01)

(58) Field of Classification Search
CPC . C09D 175/04; C08J 3/24; C08J 7/047; C08J 2375/06; C08J 2475/04
See application file for complete search history.

(56) References Cited

U.S. PATENT DOCUMENTS

| | | | |
|---|---|---|---|
| 8,369,769 B2 | 2/2013 | Ohmori et al. | |
| 9,817,358 B2* | 11/2017 | Abe | G03G 21/0017 |
| 2006/0004174 A1 | 1/2006 | Omori et al. | |
| 2009/0311017 A1* | 12/2009 | Ohmori | G03G 21/0017 |
| | | | 399/350 |
| 2010/0150628 A1 | 6/2010 | Miki et al. | |
| 2014/0086656 A1 | 3/2014 | Takahashi et al. | |
| 2014/0321880 A1 | 10/2014 | Karashima et al. | |
| 2016/0313690 A1 | 10/2016 | Kimura et al. | |
| 2016/0327899 A1 | 11/2016 | Abe et al. | |
| 2018/0043399 A1 | 2/2018 | Osajima et al. | |

FOREIGN PATENT DOCUMENTS

| | | | |
|---|---|---|---|
| CN | 106104391 A | | 11/2016 |
| EP | 2799935 A2 | | 11/2014 |
| EP | 3 086 184 A1 | | 10/2016 |
| EP | 3316043 A1 | | 5/2018 |
| JP | 2003122222 A | * | 4/2003 |
| JP | 2006-017996 A | | 1/2006 |
| JP | 2007-052062 A | | 3/2007 |
| JP | 2008-122821 A | | 5/2008 |
| JP | 2009-063993 A | | 3/2009 |
| JP | 2010-152295 A | | 7/2010 |
| JP | 2010-210879 A | | 9/2010 |
| JP | 2011-180424 A | | 9/2011 |
| JP | 2013-109369 A | | 6/2013 |
| JP | 2015-215499 A | | 12/2015 |
| WO | 2008/078461 A1 | | 7/2008 |
| WO | 2015/093252 A1 | | 6/2015 |
| WO | 2015/093441 A1 | | 6/2015 |

OTHER PUBLICATIONS

Extended European search report (EPSR), dated May 27, 2019, from corresponding European application No. EP16878947.

* cited by examiner

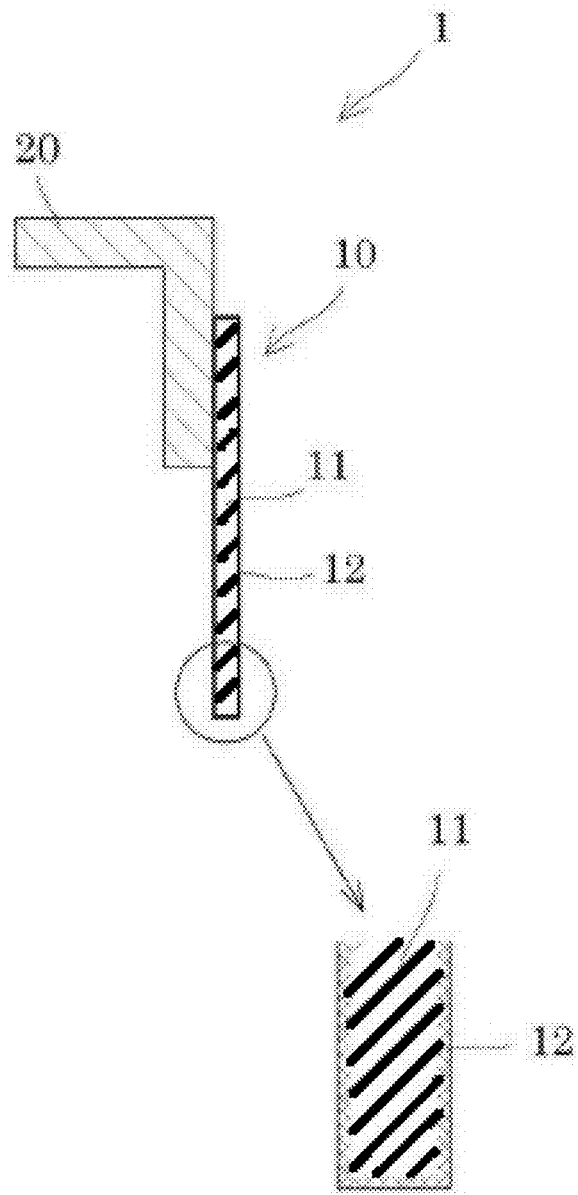

CLEANING BLADE

TECHNICAL FIELD

The present invention relates to a cleaning blade employed in image-forming apparatuses including an electrophotographic copying machine or printer, and a toner-jet-type copying machine or printer.

BACKGROUND ART

In a general electrophotographic process, an electrophotographic photoreceptor undergoes processes including at least cleaning, charging, light exposure, development, and image transfer. Each process employs a cleaning blade for removing a toner remaining on the surface of a photoreceptor drum, a conductive roller for uniformly imparting electric charge to the photoreceptor, a transfer belt for transferring a toner image, or the like. From the viewpoints of plastic deformation and wear resistance, such a cleaning blade is usually produced from a thermosetting polyurethane resin.

However, when the cleaning blade formed of a polyurethane resin is used, the friction coefficient between a blade member and a photoreceptor drum increases, whereby defoliation of the blade or generation of anomalous sounds may occur. Also, in some cases, the drive torque of the photoreceptor drum must be increased. Furthermore, the edge of the cleaning blade is caught in a photoreceptor drum or the like, resulting in drawing and cutting, whereby the edge of the cleaning blade may be damaged through wearing.

In order to solve the aforementioned problems, efforts have been made for imparting higher hardness and lower friction to a contact part of the polyurethane blade. In one proposed method, a polyurethane-made blade is impregnated with an isocyanate compound, to thereby cause reaction between the polyurethane resin and the isocyanate compound, whereby the hardness of the surface and a portion in the vicinity of the polyurethane resin blade are selectively enhanced. As a result, their friction can be reduced (see, for example, Patent Document 1).

However, when the hardness of the blade surface is enhanced, chipping of the blade occurs easily, which is problematic. Also, when the friction of the blade surface is reduced, occurrence of filming (i.e., a phenomenon of toner adhesion onto a photoreceptor drum) can be prevented. However, undesired release of toner tends to occur, problematically causing cleaning failure.

Another proposed cleaning blade has specifically regulated properties including dynamic hardness and friction coefficient of the polyurethane resin blade surface (see, for example, Patent Documents 2 to 5). However, even though properties including dynamic hardness and friction coefficient of the polyurethane resin blade surface are limited, a satisfactory blade has not been always realized. In actual setting, generation of chipping and filming after long-term use cannot be satisfactorily prevented.

Meanwhile, the performance required for a cleaning blade employed in a conventional printer or the like differs from that required for a cleaning blade employed in a process cartridge. Therefore, the material of the cleaning blade employed in a process cartridge must have high elastic modulus, and is required to have wear resistance, chipping resistance, photoreceptor surface wear resistance, and filming resistance.

PRIOR ART DOCUMENTS

Patent Documents

Patent Document 1: Japanese Patent Application Laid-Open (kokai) No. 2007-52062
Patent Document 2: Japanese Patent Application Laid-Open (kokai) No. 2010-152295
Patent Document 3: Japanese Patent Application Laid-Open (kokai) No. 2010-210879
Patent Document 4: Japanese Patent Application Laid-Open (kokai) No. 2009-63993
Patent Document 5: Japanese Patent Application Laid-Open (kokai) No. 2011-180424

SUMMARY OF THE INVENTION

Problems to be Solved by the Invention

In view of the foregoing, an object of the present invention is to provide a cleaning blade which has excellent chipping resistance and which realizes both suppression of filming and enhancement of cleaning performance.

Means for Solving the Problems

In one mode of the present invention for solving the aforementioned problems, there is provided a cleaning blade, having an elastic body formed of a rubber base material molded product, and a surface treatment layer on at least an area of the elastic body to be brought into contact with a cleaning object, characterized in that:

the surface treatment layer is a hardened product containing an isocyanate compound with which a surface portion of the elastic body has been impregnated and which has been reacted with the elastic body;

the surface treatment layer has an elastic modulus of 95 MPa or lower;

the elastic body has an elastic modulus of 20 MPa to 60 MPa; and the difference in elastic modulus between the surface treatment layer and the elastic body is 1 MPa or greater.

According to the present invention, there can be realized a cleaning blade which has excellent chipping resistance and which realizes suppression of filming and enhancement of cleaning performance.

The aforementioned surface treatment layer preferably has a thickness of 10 μm to 50 μm.

By virtue of employing such a thickness, even when the elastic modulus of the surface treatment layer is greater than that of the elastic body, the surface treatment layer can follow deformation of the elastic body, whereby the chipping resistance can be further enhanced.

Effects of the Invention

The present invention realizes a cleaning blade which has excellent chipping resistance and which realizes both suppression of filming and enhancement of cleaning performance. Also, through controlling the thickness of the surface treatment layer to 10 μm to 50 μm, there can be ensured production of a cleaning blade which has excellent chipping resistance and which realizes both suppression of filming and enhancement of cleaning performance.

BRIEF DESCRIPTION OF THE DRAWINGS

FIG. 1 A cross-section of an example of the cleaning blade according to the present invention.

MODES FOR CARRYING OUT THE INVENTION

The cleaning blade of the present invention for use in an image-forming device will next be described in detail.

Embodiment 1

As shown in FIG. 1, a cleaning blade 1 has a blade main body (also referred to as "cleaning blade") 10, and a supporting member 20. The blade main body 10 is joined to the supporting member 20 by means of an adhesive (not illustrated). The blade main body 10 is formed of an elastic body 11, which is a molded product of a rubber base material. The elastic body 11 has a surface treatment layer 12 formed at a surface portion thereof. The surface treatment layer 12 is formed by impregnating the surface portion of the elastic body 11 with the surface treatment liquid and hardening the liquid. The surface treatment layer 12 is a hardened product which contains an isocyanate compound in the surface portion of the elastic body 11 and which has been reacted with the elastic body 11, wherein the isocyanate compound is originating from the surface treatment liquid. The surface treatment layer 12 may be formed on at least an area of the elastic body 11 to be brought into contact with a cleaning object. In Embodiment 1, the surface treatment layer 12 is formed on the entire surface of the elastic body 11.

The surface treatment layer 12 has a volume elastic modulus (hereinafter referred to simply as "elastic modulus") of 95 MPa or lower. When the elastic modulus of the surface treatment layer 12 is adjusted to higher than 95 MPa, the surface treatment layer 12 cannot follow deformation of the elastic body 11, resulting in chipping of the surface treatment layer 12. When the elastic modulus of the surface treatment layer 12 is excessively small, a considerable effect of the surface treatment layer cannot be attained. Thus, the elastic modulus of the surface treatment layer is preferably adjusted to 21 MPa or greater.

The elastic modulus of the elastic body 11 is 20 MPa to 60 MPa. When the elastic modulus of the elastic body 11 is adjusted to be 20 MPa or smaller, the contact target, which is a photoreceptor drum in Embodiment 1, receives elevated torque, thereby reducing the filming suppression effect. In contrast, the elastic modulus of the elastic body 11 is adjusted to exceed 60 MPa, sufficient adhesion between the photoreceptor drum and the cleaning blade fails to be attained.

The difference in elastic modulus between the surface treatment layer 12 and the elastic body 11 is 1 MPa or greater. When the difference in elastic modulus between the surface treatment layer 12 and the elastic body 11 is smaller than 1 MPa, the filming suppression effect fails to be attained. When the difference in elastic modulus between the surface treatment layer 12 and the elastic body 11 is excessively large, chipping resistance tends to decrease. Thus, the difference is preferably adjusted to, for example, 35 MPa or smaller.

As described above, the elastic modulus of the surface treatment layer 12 is 95 MPa or smaller; the elastic modulus of the elastic body 11 is 20 MPa to 60 MPa; and the difference in elastic modulus between the surface treatment layer 12 and the elastic body 11 is 1 MPa or greater. In this case, although the details will be described below, the cleaning blade 1 realizes all of excellent chipping resistance, suppression of filming, and enhancement in cleaning performance.

Furthermore, the surface treatment layer 12 is preferably formed at a surface portion of the elastic body 11 so as to have a very small thickness; specifically, 10 μm to 50 μm. Such a thickness is very small and about 1/10 the thickness of a conventional surface treatment layer 12. However, as mentioned above, even when the elastic modulus of the surface treatment layer increases, the layer can follow deformation of the elastic body 11, thereby providing excellent chipping resistance.

Also, the surface treatment layer 12 preferably has a dynamic friction coefficient of 1.0 to 2.5. When the dynamic friction coefficient is smaller than 1.0, undesired release of toner occurs, thereby causing cleaning failure. When the dynamic friction coefficient is greater than 2.5, a photoreceptor drum receives an elevated torque, and a toner is deposited onto the photoreceptor. If the deposited toner is pressed by a blade, the toner is firmly fixed onto the photoreceptor drum, resulting in filming. Therefore, through adjusting the dynamic friction coefficient to 1.0 to 2.5, the torque is reduced, to thereby prevent occurrence of filming and suppress cleaning failure.

Thus, by controlling, to fall within specific ranges, the elastic modulus of the surface treatment layer 12, the elastic modulus of the elastic body 11, the difference in elastic modulus therebetween, the thickness of the surface treatment layer 12, and the dynamic friction coefficient, the cleaning blade 1 can reliably realize all of excellent chipping resistance, suppression of filming, and enhancement in cleaning performance.

The surface treatment layer 12 having a very small thickness can be formed at a surface portion of the elastic body 11 by use of a surface treatment liquid having high affinity to the elastic body 11. By use of such a surface treatment liquid, the elastic body 11 can be readily impregnated with the surface treatment liquid, whereby residence of an excess amount of surface treatment liquid on the surface of the elastic body 11 can be prevented. Thus, a conventionally employed removal step of removing an excessive isocyanate compound can be omitted.

The surface treatment liquid for forming the surface treatment layer 12 contains an isocyanate compound and an organic solvent. Examples of the isocyanate compound contained in the surface treatment liquid include isocyanate compounds such as tolylene diisocyanate (TDI), 4,4'-diphenylmethane diisocyanate (MDI), p-phenylene diisocyanate (PPDI), naphthylene diisocyanate (NDI), and 3,3'-dimethylbiphenyl-4,4'-diyl diisocyanate (TODI), and oligomers and modified products thereof.

As the surface treatment liquid, there is preferably used a mixture of an isocyanate compound, a polyol, and an organic solvent, or a mixture of a prepolymer having isocyanate groups and an organic solvent, wherein the prepolymer is an isocyanate-group-containing compound which is produced by reacting an isocyanate compound with a polyol and which has an isocyanate group at an end thereof. Among such surface treatment liquids, more preferred surface treatment liquids are a mixture of a bi-functional isocyanate compound, a tri-functional polyol, and an organic solvent; and a mixture of an organic solvent and an isocyanate-group-containing prepolymer obtained through reaction between a bi-functional isocyanate compound and a tri-functional polyol. In the case where the mixture of a bi-functional isocyanate compound, a tri-functional polyol, and an organic solvent is used, the bi-functional isocyanate compound reacts with the tri-functional polyol in the step of impregnating the surface portion with the surface treatment liquid and curing the liquid, whereby an isocyanate-group-containing prepolymer having an isocyanate group at an end thereof is produced. The prepolymer is hardened and reacts with the elastic body 11.

Thus, by use of a surface treatment liquid which allows formation of an isocyanate-group-containing prepolymer via reaction between a bi-functional isocyanate compound and a tri-functional polyol, or a surface treatment liquid containing an isocyanate-group-containing prepolymer, the formed surface treatment layer 12 exhibits high hardness and low friction, even though it is a thin layer. As a result, chipping resistance, suppression of filming, and excellent cleaning performance can be attained. Notably, the surface treatment liquid is appropriately selected in consideration of wettability to the elastic body 11, the degree of immersion, and the pot life of the surface treatment liquid.

Examples of the bi-functional isocyanate compound include 4,4'-diphenylmethane diisocyanate (MDI), isophorone diisocyanate (IPDI), 4,4'-dicyclohexylmethane diisocyanate (H-MDI), trimethylhexamethylene diisocyanate (TMHDI), tolylene diisocyanate (TDI), carbodiimide-modified MDI, polymethylene polyphenyl polyisocyanate, 3,3'-dimethylbiphenyl-4,4'-diyl diisocyanate (TODI), naphthylene diisocyanate (NDI), xylene diisocyanate (XDI), lysine diisocyanate methyl ester (LDI), dimethyl diisocyanate, and oligomers and modified products thereof. Among the bi-functional isocyanate compounds, those having a molecular weight of 200 to 300 are preferably used. Among the above isocyanate compounds, 4,4'-diphenylmethane diisocyanate (MDI) and 3,3'-dimethylbiphenyl-4,4'-diyl diisocyanate (TODI) are preferred. Particularly when the elastic body 11 is formed of a polyurethane, and the bi-functional isocyanate compound has high affinity to polyurethane, integration of the surface treatment layer 12 and the elastic body 11 via chemical bonding can be further enhanced.

Examples of the tri-functional polyol include tri-hydric aliphatic polyols such as glycerin, 1,2,4-butanetriol, trimethylolethane (TME), trimethylolpropane (TMP), and 1,2,6-hexanetriol; polyether triols formed through addition of ethylene oxide, butylene oxide, or the like to tri-hydric aliphatic polyols; and polyester triols formed through addition of a lactone or the like to tri-hydric aliphatic polyols. Among tri-hydric polyols, those having a molecular weight of 150 or lower are preferably used. Among the above tri-functional polyols, trimethylolpropane (TMP) is preferably used. When a tri-functional polyol having a molecular weight of 150 or lower is used, reaction with isocyanate proceeds at high reaction rate, whereby a surface treatment layer with high hardness can be formed. Also, when a surface treatment liquid containing a tri-hydric polyol is used, three hydroxyl groups react with isocyanate groups, to thereby yield the surface treatment layer 12 having high cross-link density attributed to a 3-dimensional structure.

No particular limitation is imposed on the organic solvent, so long as it can dissolve an isocyanate compound and a polyol, and a solvent having no active hydrogen which reacts with the isocyanate compound is suitably used. Examples of the organic solvent include methyl ethyl ketone (MEK), methyl isobutyl ketone (MIBK), tetrahydrofuran (THF), acetone, ethyl acetate, butyl acetate, toluene, and xylene. The lower the boiling point of the organic solvent, the higher the solubility. By use of a low-boiling-temperature solvent, drying can be completed rapidly after impregnation, thereby attaining uniform treatment. Notably, the organic solvent is chosen from these organic solvents in consideration of the degree of swelling of the elastic body 11. From this viewpoint, methyl ethyl ketone (MEK), acetone, and ethyl acetate are preferably used.

The elastic body 11 is formed of a matrix having active hydrogen. Examples of the rubber base material forming the matrix having active hydrogen include polyurethane, epichlorohydrin rubber, nitrile rubber (NBR), styrene rubber (SBR), chloroprene rubber, and ethylene-propylene-diene rubber (EPDM). Of these, polyurethane is preferred, from the viewpoint of reactivity to the isocyanate compound.

Examples of the rubber base material formed of polyurethane include those mainly comprising at least one species selected from among aliphatic polyethers, polyesters, and polycarbonates. More specifically, such a rubber base material is mainly formed of a polyol containing at least one species selected from among aliphatic polyethers, polyesters, and polycarbonates, the polyol molecules being bonded via urethane bond. Examples of preferred polyurethanes include polyether-based polyurethane, polyester-based polyurethane, and polycarbonate-based polyurethane. Alternatively, a similar elastic body employing polyamido bond, ester bond, or the like may also be used, instead of urethane bond. Yet alternatively, a thermoplastic elastomer such as polyether-amide or polyether-ester may also be used. Also, in addition to, or instead of a rubber base material having active hydrogen, a filler or a plasticizer having active hydrogen may be used.

The surface portion of the elastic body 11 is impregnated with the surface treatment liquid, and the liquid is hardened, to thereby form the surface treatment layer 12 at the surface portion of the elastic body 11. No particular limitation is imposed on the method of impregnating the surface portion of the elastic body 11 with the surface treatment liquid and hardening the liquid. In one specific procedure, the elastic body 11 is immersed in the surface treatment liquid, and then the elastic body is heated. In another procedure, the surface treatment liquid is sprayed onto the surface of the elastic body 11 for impregnation, and then the elastic body is heated. No particular limitation is imposed on the heating method, and examples include heating, forced drying, and natural drying.

More specifically, when a mixture of an isocyanate compound, a polyol, and an organic solvent is used as a surface treatment liquid, the surface treatment layer 12 is formed via reaction of the isocyanate compound with the polyol, to form a prepolymer concomitant with hardening, during impregnation of the surface portion of the elastic body 11 with the surface treatment liquid, and reaction of the isocyanate groups with the elastic body 11.

In the case where a prepolymer is used as a surface treatment liquid, the isocyanate compound and the polyol present in the surface treatment liquid are caused to react in advance under specific conditions, to thereby convert the surface treatment liquid to a prepolymer having an isocyanate group at an end thereof. The surface treatment layer 12 is formed via impregnation of the surface portion of the elastic body 11 with the surface treatment liquid, and post hardening and reaction of isocyanate groups with the elastic body 11. Formation of the prepolymer from the isocyanate compound and the polyol may occur during impregnation of the surface portion of the elastic body 11 with the surface treatment liquid, and the extent of reaction may be controlled by regulating reaction temperature, reaction time, and the atmosphere of the reaction mixture. Preferably, the formation is performed at a surface treatment liquid temperature of 5° C. to 35° C. and a humidity of 20% to 70%. Notably, the surface treatment liquid may further contain a cross-linking agent, a catalyst, a hardening agent, etc., in accordance with needs.

The surface treatment layer 12 is formed on at least an area of the elastic body 11 to be brought into contact with a cleaning object. For example, the surface treatment layer 12 may be formed only on a front end area of the elastic body 11, or on the entire surface of the elastic body. Alternatively, after fabrication of a cleaning blade by bonding the elastic body 11 to the supporting member 20, the surface treatment layer 12 may be formed only on a front end area of the elastic body 11, or on the entire surface of the elastic body. Yet alternatively, the surface treatment layer 12 may be formed on one or both surfaces or the entire surface of a rubber molded product, before cutting the elastic body 11 into a blade shape, and then the rubber molded product is cut.

According to the present invention, through controlling the elastic modulus of the surface treatment layer 12, the elastic modulus of the elastic body 11, and the difference in elastic modulus therebetween to fall within specific ranges, there can be provided a cleaning blade which has excellent chipping resistance and realizes suppression of filming and enhancement in cleaning performance. In addition, through controlling the thickness of the surface treatment layer, excellent chipping resistance, suppression of filming, and enhancement in cleaning performance can be ensured.

EXAMPLES

The present invention will next be described in detail by way of examples, which should not be construed as limiting the invention thereto.

Firstly, cleaning blades of Examples 1 to 11 and Comparative Examples 1 to 8 were prepared. These cleaning blades differ in the elastic modulus values of their surface treatment layers, elastic modulus values of their elastic bodies (hereinafter referred to as rubber elastic bodies), or differ in elastic modulus therebetween.

Example 1

Production of Rubber Elastic Body

A caprolactone-based polyol (molecular weight: 2,000) (100 parts by mass) serving as the polyol, and 4,4'-diphenylmethane diisocyanate (MDI) (55 parts by mass) serving as the isocyanate compound were allowed to react at 115° C. for 20 minutes. Subsequently, 1,4-butanediol (11.5 parts by mass) and trimethylolpropane (2.9 parts by mass), serving as cross-linking agents, were added thereto, and the mixture was transferred to a metal mold maintained at 140° C. and heated for hardening for 40 minutes. After molding, each molded product was cut to pieces having dimensions of 15.0 mm in width, 2.0 mm in thickness, and 350 mm in length. The thus-obtained rubber elastic body pieces were found to have an elastic modulus of 20 MPa.

Preparation of Surface Treatment Liquid

MDI (bi-functional isocyanate compound, product of Nippon Polyurethane Industry Co., Ltd., molecular weight: 250.25), PDO (dihydric polyol, product of Tokyo Chemical Industry Co., Ltd., molecular weight: 76.09), TMP (trifunctional polyol, product of Mitsubishi Gas Chemical Company, Inc., molecular weight: 134.17), and MEK (organic solvent) were mixed together, so that the ratio by amount of the isocyanate group to hydroxyl group was adjusted to 1.2, and the ratio by amount of bi-functional polyol to tri-functional polyol was adjusted to 85/15. As a result, a surface treatment liquid having a concentration of 3 mass % was prepared. In the specification, the surface treatment liquid concentration (mass %) is defined as the ratio of the sum of the isocyanate compound amount and the polyol amount contained in the liquid to the entire amount of the liquid.

Surface Treatment of Rubber Elastic Body

While the surface treatment liquid was maintained at 23° C., the rubber elastic body was immersed in the surface treatment liquid for 10 seconds. The thus-treated rubber elastic body was heated for 10 minutes in an oven maintained at 50° C. Thereafter, the surface-treated rubber elastic body was attached to a supporting member, to thereby fabricate a cleaning blade. The thus-obtained cleaning blade had a surface treatment layer having an elastic modulus of 21 MPa and a thickness of 30 μm, and exhibited a difference in elastic modulus between the surface treatment layer and the rubber elastic body of 1.0 MPa.

The elastic modulus of the surface treatment layer and that of the rubber elastic body were indentation elastic modulus values as determined according to ISO 14577. The indentation elastic modulus was measured through a load-unload test by means of Dynamic Ultra Micro Hardness Tester (product of Shimadzu Corporation) under the following conditions: retention time (5 s), maximum test load (0.98 N), loading speed (0.14 N/s), and indentation depth (3 μm to 10 μm).

The thickness of the surface treatment layer was measured by means of Dynamic Ultra Micro Hardness Tester (product of Shimadzu Corporation) according to JIS Z2255 and ISO 14577. Specifically, the surface hardness of the rubber elastic body was measured, and then the elastic body was subjected to the surface treatment. The rubber elastic body was cut, and the elastic modulus profile from the cut surface to the inside of the rubber elastic body was measured. The depth where the percent change in elastic modulus from the surface to the depth of 10 μm with respect to the surface was 30% or less was determined. The thus-determined depth (length) was employed as the thickness of the surface treatment layer.

Example 2

A rubber elastic body was fabricated through repeating the procedure of Example 1. The thus-obtained rubber elastic body was found to have an elastic modulus of 20 MPa. The rubber elastic body was subjected to a surface treatment similar to that performed in Example 1 by use of the same surface treatment liquid as employed in Example 1 but having a concentration of 8 mass %, to thereby produce a cleaning blade. The surface treatment layer of the cleaning blade was found to have an elastic modulus of 25 MPa and a thickness of 30 μm. The difference in elastic modulus between the surface treatment layer and the rubber elastic body was 5.0 MPa.

Example 3

The procedure of Example 1 was repeated, except that MDI (62 parts by mass), 1,4-butanediol (13.3 parts by mass), and trimethylolpropane (3.3 parts by mass) were used, to thereby fabricate a rubber elastic body. The thus-obtained rubber elastic body was found to have an elastic modulus of 36 MPa. The rubber elastic body was subjected to a surface treatment similar to that performed in Example 1, except that the same surface treatment liquid but having a concentration of 20 mass % was used, to thereby produce a cleaning blade. The surface treatment layer of the cleaning blade was found to have an elastic modulus of 64 MPa and a thickness of 30 μm. The difference in elastic modulus between the surface treatment layer and the rubber elastic body was 28 MPa.

Example 4

The procedure of Example 1 was repeated, except that MDI (69 parts by mass), 1,4-butanediol (15.2 parts by mass), and trimethylolpropane (3.8 parts by mass) were used, and a metal mold maintained at 160° C. was used, to thereby fabricate a rubber elastic body. The thus-obtained rubber elastic body was found to have an elastic modulus of 42 MPa. The rubber elastic body was subjected to a surface treatment similar to that performed in Example 1, except that the same surface treatment liquid but having a concentration of 15 mass % was used, to thereby produce a cleaning blade. The surface treatment layer of the cleaning blade was found to have an elastic modulus of 63 MPa and a thickness of 30 μm. The difference in elastic modulus between the surface treatment layer and the rubber elastic body was 21 MPa.

Example 5

The procedure of Example 1 was repeated, except that MDI (71 parts by mass), 1,4-butanediol (15.9 parts by mass), and trimethylolpropane (3.9 parts by mass) were used, and a metal mold maintained at 170° C. was used, to thereby fabricate a rubber elastic body. The thus-obtained rubber elastic body was found to have an elastic modulus of 55 MPa. The rubber elastic body was subjected to a similar surface treatment by use of the same surface treatment liquid as employed in Example 4, to thereby produce a cleaning blade. The surface treatment layer of the cleaning blade was found to have an elastic modulus of 87 MPa and a thickness of 30 μm. The difference in elastic modulus between the surface treatment layer and the rubber elastic body was 32 MPa.

Example 6

The procedure of Example 1 was repeated, except that MDI (74 parts by mass), 1,4-butanediol (16.6 parts by mass), and trimethylolpropane (4.1 parts by mass) were used, and a metal mold maintained at 170° C. was used, to thereby fabricate a rubber elastic body. The thus-obtained rubber elastic body was found to have an elastic modulus of 60 MPa. The rubber elastic body was subjected to a similar surface treatment by use of the same surface treatment liquid as employed in Example 4, to thereby produce a cleaning blade. The surface treatment layer of the cleaning blade was found to have an elastic modulus of 95 MPa and a thickness of 35 μm. The difference in elastic modulus between the surface treatment layer and the rubber elastic body was 35 MPa.

Comparative Example 1

The procedure of Example 3 was repeated, to thereby form a rubber elastic body. The thus-obtained rubber elastic body was found to have an elastic modulus of 30 MPa. The rubber elastic body was subjected to no further surface treatment, and bonded to a supporting member, to thereby produce a cleaning blade. Notably, the surface elastic modulus values of the table below are those of the corresponding rubber elastic bodies.

Comparative Example 2

The procedure of Example 6 was repeated, to thereby form a rubber elastic body. The thus-obtained rubber elastic body was found to have an elastic modulus of 60 MPa. The rubber elastic body was subjected to no further surface treatment, and bonded to a supporting member, to thereby produce a cleaning blade. Notably, the surface elastic modulus values of the table below are those of the corresponding rubber elastic bodies.

Comparative Example 3

The procedure of Example 6 was repeated, to thereby form a rubber elastic body. The thus-obtained rubber elastic body was found to have an elastic modulus of 60 MPa. The rubber elastic body was subjected to a surface treatment similar to that performed in Example 1 by use of the same surface treatment liquid as employed in Example 1 but having a concentration of 35 mass %, to thereby produce a cleaning blade. The surface treatment layer of the cleaning blade was found to have an elastic modulus of 99 MPa and a thickness of 30 μm. The difference in elastic modulus between the surface treatment layer and the rubber elastic body was 39 MPa.

Comparative Example 4

The procedure of Example 1 was repeated, to thereby form a rubber elastic body. The thus-obtained rubber elastic body was found to have an elastic modulus of 20 MPa. The rubber elastic body was subjected to a surface treatment similar to that performed in Example 1, except that the same surface treatment liquid but having a concentration of 1 mass % was used, to thereby produce a cleaning blade. The surface treatment layer of the cleaning blade was found to have an elastic modulus of 20.3 MPa and a thickness of 30 μm. The difference in elastic modulus between the surface treatment layer and the rubber elastic body was 0.3 MPa.

Test Example 1

<Elastic Modulus of Surface Treatment Layer and that of Rubber Elastic Body, and Difference in Elastic Modulus>

Each of the cleaning blades produced in the Examples 1 to 6 and Comparative Examples 1 to 4 was evaluated in terms of chipping resistance, filming suppression, and cleaning performance. The above evaluation was performed by means of a color MFP (A3 size, 55 sheets/minute).

Chipping resistance was evaluated by setting the cleaning blade in a cartridge, and carrying out printing of 100,000 sheets. After completion of the printing job, in the case where no chipping or wear was observed, the state was evaluated as "○." When slight chipping or wear was observed, the state was evaluated as "Δ." When any chipping or wear was observed, the state was evaluated as "X."

Filming suppression was also evaluated, by setting the cleaning blade in a cartridge, and carrying out printing of 100,000 sheets. After completion of the printing job, in the case where no toner adhesion was observed, the state was evaluated as "○." When slight toner adhesion was observed, the state was evaluated as "Δ." When toner adhesion was observed, the state was evaluated as "X."

Cleaning performance was also evaluated, by setting the cleaning blade in a cartridge, and carrying out printing of 100,000 sheets. After completion of the printing job, in the case where no toner remaining was observed, the state was evaluated as "○." When slight toner remaining was observed, the state was evaluated as "Δ." When any toner remaining was observed, the state was evaluated as "X." Table 1 shows the results.

With reference to Table 1, comparisons were made for Examples 1 to 6 with Comparative Examples 1 to 4. As shown in Table 1, the cleaning blades of Examples 1 to 6 exhibited an elastic modulus of the surface treatment layer of 95 MPa or lower (required value), an elastic modulus of the rubber elastic body of 20 MPa to 60 MPa (required value), and a difference in elastic modulus between the surface treatment layer and the rubber elastic body of 1 MPa or greater (required value). All the cleaning blades of Examples 1 to 6 exhibited excellent chipping resistance (○), filming suppression (○), and cleaning performance (○). In contrast, the cleaning blade of Comparative Example 3, which had an elastic modulus of the surface treatment layer higher than 95 MPa, exhibited poor chipping resistance (X) and cleaning performance (X). The cleaning blade of Comparative Example 4, which had a difference in elastic modulus between the surface treatment layer and the rubber elastic body smaller than 1 MPa, exhibited poor cleaning performance (X). The cleaning blades of Comparative Examples 1 and 2, which underwent no surface treatment, exhibited poor filming suppression (X). As a result, through controlling the elastic modulus of the surface treatment layer, the elastic modulus of the rubber elastic body, and the difference in elastic modulus therebetween to fall within specific ranges (Examples 1 to 4), all of excellent chipping resistance, filming suppression, and enhancement in cleaning performance could be attained.

TABLE 1

|  | Required range |  | Ex. 1 | Ex. 2 | Ex. 3 | Ex. 4 | Ex. 5 | Ex. 6 | Comp. 1 | Comp. 2 | Comp. 3 | Comp. 4 |
|---|---|---|---|---|---|---|---|---|---|---|---|---|
| Elastic modulus of surface treatment layer | ≤95 | MPa | 21 | 25 | 64 | 63 | 87 | 95 | 30 | 60 | 99 | 20.3 |
| Elastic modulus of rubber elastic body | 20-60 | MPa | 20 | 20 | 36 | 42 | 55 | 60 | 30 | 60 | 60 | 20 |
| Difference in elastic modulus between surface treatment layer and rubber elastic body | ≥1 | MPa | 1 | 5 | 28 | 21 | 32 | 35 | 0 | 0 | 39 | 0.3 |
| Chipping resistance |  |  | ○ | ○ | ○ | ○ | ○ | ○ | ○ | ○ | X | ○ |
| Filming suppression |  |  | ○ | ○ | ○ | ○ | ○ | ○ | X | X | ○ | ○ |
| Cleaning performance |  |  | ○ | ○ | ○ | ○ | ○ | ○ | X | ○ | X | X |

INDUSTRIAL APPLICABILITY

The cleaning blade of the present invention suitably serves as a cleaning blade employed in image-forming apparatuses such as an electrophotographic copying machine or printer, and a toner-jet-type copying machine or printer. The cleaning blade of the present invention may find other uses, such as various blades and cleaning rollers.

BRIEF DESCRIPTION OF THE DRAWINGS 1 cleaning blade
10 blade main body
11 elastic body
12 surface treatment layer
20 supporting member

The invention claimed is:

1. A cleaning blade, comprising:
   an elastic body formed of a rubber base material molded product, and a surface treatment layer on at least an area of the elastic body to be brought into contact with a cleaning object, wherein, the surface treatment layer is a hardened product containing an isocyanate compound with which a surface portion of the elastic body has been impregnated and which has been reacted with the elastic body;

the surface treatment layer has an elastic modulus of 95 MPa or lower;

the elastic body has an elastic modulus of 20 MPa to 60 MPa; and the difference in elastic modulus between the surface treatment layer and the elastic body is 1 MPa or greater.

2. The cleaning blade according to claim 1, wherein the surface treatment layer has a thickness of 10 μm to 50 μm.

* * * * *